3,462,986
Patented Aug. 26, 1969

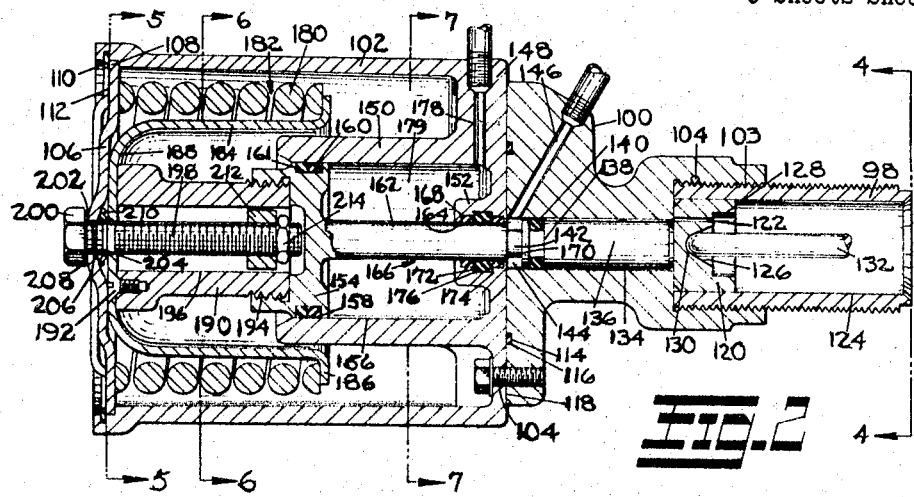
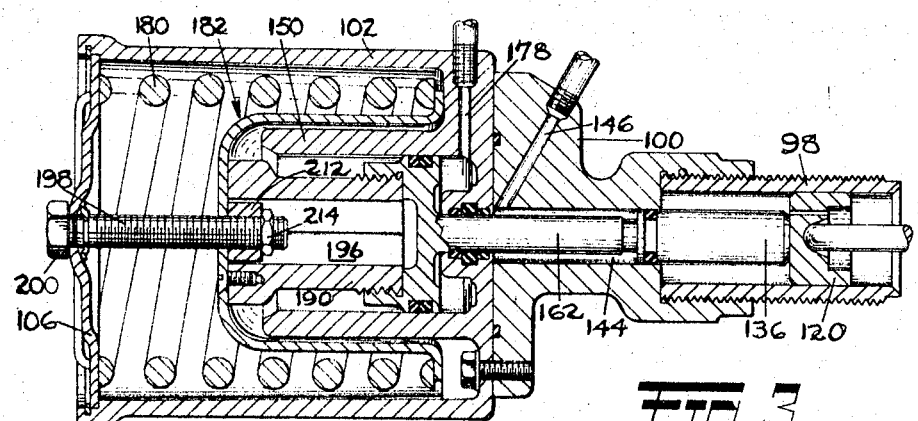
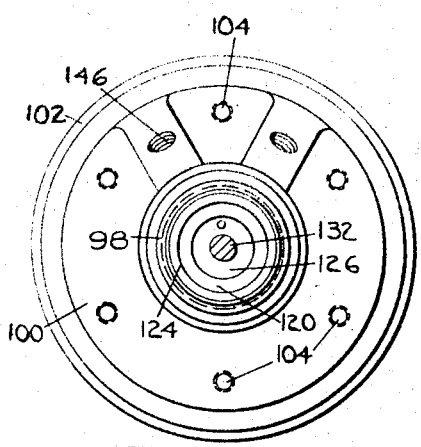
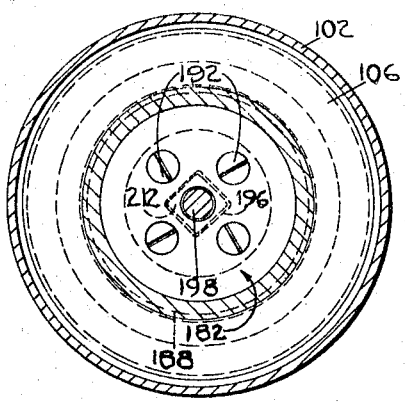

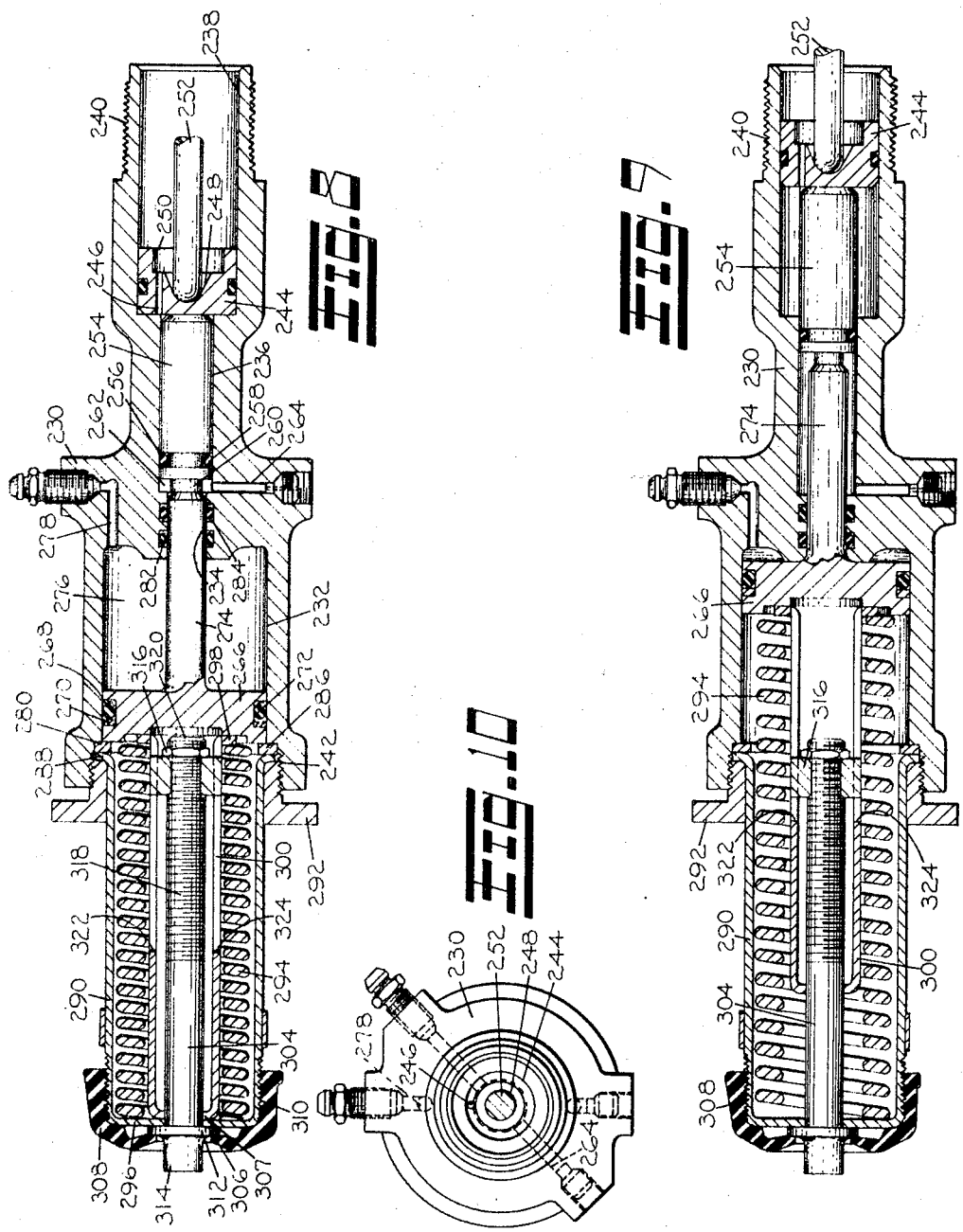

3,462,986
BRAKE ACTUATOR
Frank T. Cox, Jr., Ashtabula, Richard L. Powers, Conneaut, and William J. Williams, Ashtabula, Ohio, assignors, by mesne assignments, to Rockwell-Standard Company, Pittsburgh, Pa., a corporation of Delaware
Filed Oct. 26, 1967, Ser. No. 678,279
Int. Cl. F01b 7/00
U.S. Cl. 92—63                    9 Claims

ABSTRACT OF THE DISCLOSURE

A combined service and emergency hydraulic actuator for wedge type brakes in which a hydraulic service actuator and a spring motor including a hollow spring guide providing power for emergency brake actuation are coaxially arranged with a motion transmitting hydraulic motor interposed therebetween and normally operative to maintain the spring motor disengaged from the service actuator.

BACKGROUND OF THE INVENTION

This invention is an improvement upon existing combined service and emergency hydraulic actuators for wedge type brakes, of which that disclosed in U.S. Patent No. 3,232,175, issued Feb. 1, 1966 to F. T. Cox., Jr., et al., for "Brake Systems" is illustrative. Wedge brakes are used commercially primarily on heavy duty vehicles such as trucks.

Most of the wedge type brakes heretofore constructed for such vehicles have been pneumatically, rather than hydraulically, actuated. The structure disclosed in Williams' U.S. Patent No. 3,136,227, issued June 9, 1964, for "Brake Operating Mechanism," is preferred construction for pneumatically powered combined service and emergency actuators for wedge type brakes. The popularity of pneumatically actuated brakes for such vehicles has been in part due to the preference of users of such vehicles for pneumatic brake systems but has also been due to certain practical inadequacies of the prior designs of combined emergency and service hydraulic actuator.

In wedge type brakes, particularly wedge type brakes equipped with but a single actuator, a long (in the order of 1¾" for example) operating stroke of the wedge and both the service and emergency actuator output elements is required for actuation. With the brake de-energized, the wedge and its shank extension which extends into engagement with the service actuator output element is normally centered between adjacent ends of the brake shoes to be expanded. When, however, the wedge is moved to expand the brake shoes into engagement with the brake drum, the drum imparts a circumferential turning force to the shoes, and, as a result, the brake shoes transmit lateral forces to the wedge causing the wedge to pivot relative to its connection to the service brake actuator output element. In pneumatically powered actuators, this lateral movement creates no problem. In hydraulic actuators, however, when the stem of the wedge is directly connected to the hydraulic service actuator piston, as illustrated, for example, in the aforesaid U.S. Patent No. 3,232,175, it is necessary to provide a service actuator piston and cylinder large enough to accommodate this lateral pivotal motion of the wedge stem. This is much larger than is necessary to develop the required force under the available pressures and, as a result, an excessive volume of hydraulic fluid must be forced into the service chamber to provide the required long stroke of the wedge while permitting the inherent lateral motion. This increases the time required for brake actuation and necessitates larger and more expensive components for the entire brake system than would otherwise be necessary.

A basic object of the present invention is to eliminate these difficulties.

More specifically, it is an object of this invention to provide a hydraulic combined service and emergency actuator of such improved construction that but a relatively small volume of hydraulic fluid is required for the fully expanded hydraulic service chamber and the fully expanded hydraulic chamber for maintaining the emergency spring motor actuator inoperative under normal operating conditions.

A further specific object is to provide such a combined actuator which has a small diameter piston as the actual service actuator piston and a separate large size motion transmitting member abutted by the service piston and provided with a socket on its opposite face to pivotally receive the end of the shank of the wedge and accommodate the lateral pivotal motion of the wedge shank when the brake is energized.

Further objects of the present invention are to provide:
  (a) A spring powered emergency actuator utilizing but a single coil spring arranged in coaxial alignment with the service actuator and normally held in inoperative position by a hydraulic expansible chamber operatively interposed between the output of the spring powered emergency actuator;
  (b) In one embodiment, a spring powered actuator received in telescopic relation about a hydraulic expansible chamber which maintains it in its inoperative condition, thereby providing an axially compact overall unit; and
  (c) In a second embodiment, a spring powered emergency actuator arranged in axial alignment with and substantially equal in diameter to a hydraulic unit which maintains the spring actuator inoperative, thus providing an axially elongated small diameter actuator.

The one of the two embodiments which will be preferred is dictated primarily by spatial considerations and will depend on the configuration of the adjacent vehicle components including the axle upon which the brake mechanism is mounted. The structure illustrated in the first embodiment permits selective angular orientation of the hydraulic fluid input connections relative to the brake so that these connections can be conveniently located in final assembly, so that the hoses can be readily attached.

These and other objects of the present invention will become more fully apparent by reference to the appended claims and as the following description proceeds in reference to the accompanying drawings.

DESCRIPTION OF DRAWINGS

FIGURE 2 is a longitudinal sectional view through a brake actuator constituting a first embodiment of the present invention and showing the configuration of the parts when utilized in the system of FIGURE 1 and that system is in its normal operative condition, but the brakes are not applied;

FIGURE 3 is a view similar to FIGURE 2 but illustrating the configuration of the parts when there has been a hydraulic failure in the brake system of FIGURE 1 or that system has been actuated to its "parking" condition;

FIGURE 4 is an end view of the actuator of FIGURE 2 as viewed from the right of FIGURE 2;

FIGURE 5 is a sectional view taken substantially along the line 5—5 of FIGURE 2;

FIGURE 8 is a longitudinal sectional view through a modified brake actuator constituting a second embodiment of the present invention and illustrating the configuration of the parts when the system of FIGURE 1 is normally operative and the brakes are not applied;

FIGURE 9 is a view similar to FIGURE 8 but illustrating the configuration of the parts of the second embodiment of this invention when there has been a hydraulic failure in the system of FIGURE 1 or that system has been actuated to its "parking" condition; and FIGURE 10 is a right hand end view of the structure of FIGURE 8.

BRAKE SYSTEM

Figure 1:
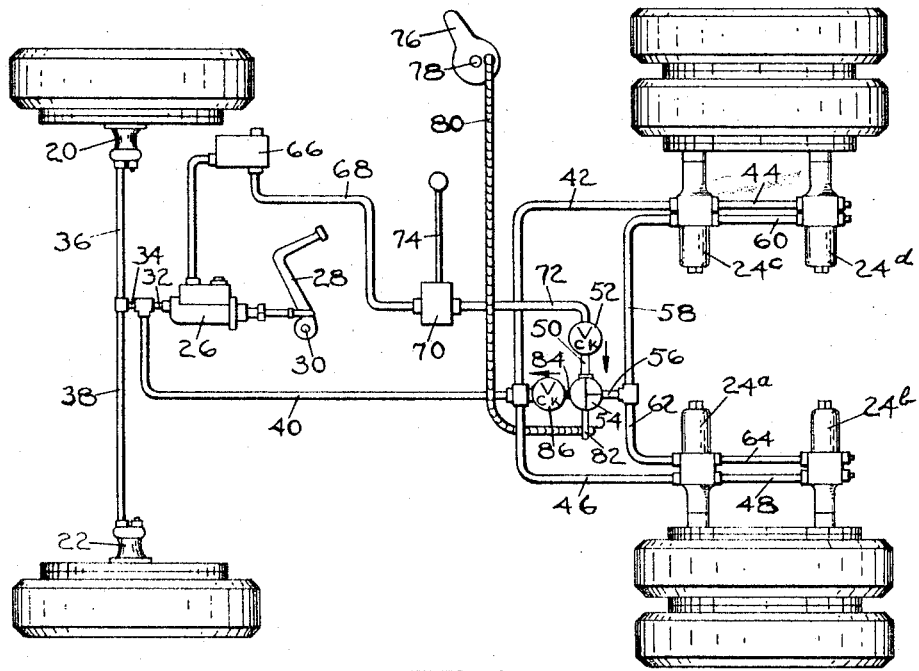
FIGURE 1 is a diagrammatic illustration of a hydraulic braking system in which the brake actuators of the present invention may be utilized.
Figure 6:
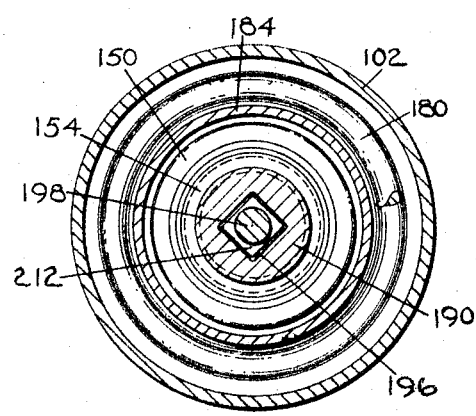
FIGURE 6 is a sectional view taken substantially along the line 6—6 of FIGURE 2.
Figure 7:
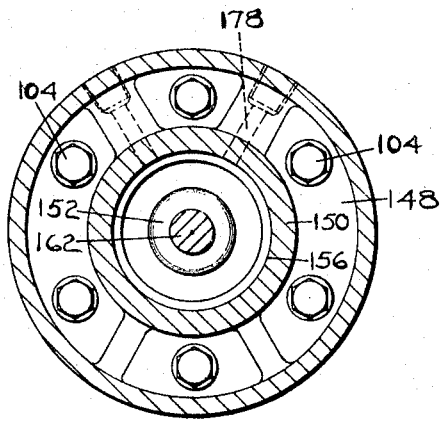
FIGURE 7 is a sectional view taken substantially along the line 7—7 of FIGURE 2.

Referring now in detail to the drawings and particularly to FIGURE 1, the combined normal service brake system and emergency brake system is there shown as applied to a truck having a pair of front wheel brake actuator assemblies indicated generally at 20 and 22 which are of conventional construction and dual rear brake units, each comprising preferably identical combined service and emergency actuator assemblies designated 24a, 24b, 24c and 24d, which may be of either the construction shown in FIGURES 2-7 or 8-10, depending primarily upon the space limitations involved in the particular installation. Each of these units may be associated with brake assemblies (the details of which have been omitted for clarity) in the manner disclosed, for example, in U.S. Patent No. 3,037,584, issued June 5, 1962, to F. T. Cox, Jr., et al., for wedge actuated brake assembly. Depending upon the rear brake construction, either single or multiple actuators may be required at the rear wheels.

The normal service brake system comprises a master cylinder 26 conventionally actuated by a foot pedal 28 pivoted on the vehicle frame as at 30, a series of conduits 32, 34 and 36 or 38 connecting the output of the master cylinder 26 to the front wheel brake actuator assemblies 20 and 22, and a series of conduits 32, 40, 42 and 44 or 46 and 48 connecting the output of the master cylinder 26 to the normal service brake actuator portions of the combined actuators 24c and 24d, and 24a and 24b respectively. In such a system, so long as it is normally operative, depression of the pedal 28 will energize the brakes of all four wheels.

The spring powered emergency actuator portions of the combined actuators 24a, 24b, 24c and 24d are normally maintained inoperative by hydraulic pressure maintained in a system consisting of conduit 50 downstream of a check valve 52, valve 54 and conduits 56, 58, 60, 62 and 64. (In its normal position, valve 54 provides a fluid passage between conduits 50 and 56 only.) This system is pressurized by hydraulic fluid from reservoir 66 via conduit 68, double acting pump 70, and conduit 72 leading to the inlet of check valve 52. Manual actuation of the double acting pump 70 by manipulation of the handle 74 will withdraw hydraulic fluid from the reservoir 66 and pump it through the conduits 68 and 72, through the check valve 52 in to pressurize the system formed by the conduits 56–64 inclusive. When the pressure in this system reaches a predetermined magnitude, the emergency actuator portions of the combined brake actuators 24a–d will be deactivated hydraulically. So long as this pressure is maintained in the conduits 56–64, the actuation of the rear brakes will be solely dependent upon the pressure applied through the service brake system under control of the master cylinder 26 as previously described.

The driver will wish to actuate the emergency actuator portions of the combined actuators 24a–d under two conditions: (a) when he parks the vehicle, or (b) if in depressing the pedal 28 he senses that there is no resultant pressure buildup at the outlet of master cylinder 26. In either event, when it is desired to activate the emergency brake actuator portions of the combined actuators 24a–24d, the handle 76 which is pivotally mounted upon the vehicle frame at 78 (at a position in the vehicle cab convenient to the operator) will be pivoted manually in a clockwise direction. This motion will, through the action of the interconnecting link 80 and the arm 82 of the valve 54, cause the valve 54 to shift in a counter-clockwise direction as viewed in FIGURE 1 to establish direct communication of both of the conduits 50 and 56 with the conduit 84 connected to the inlet of the check valve 86. The outlet of the check valve 86 is connected directly to the conduits 40, 42 and 46 of the service brake line. As a result of the interconnection of conduits 50 and 56 with the service brake line 40 through the conduit 84 and the check valve 86, the pressure within the conduits 56–64 will be equalized with that in conduits 40, 42 and 46, allowing the mechanical actuation of the emergency brake actuator portions of the combined brake actuators 24a–d if the pressure in conduits 40, 42 and 46 is less than that in conduits 56–64 when valve 54 is so shifted. This, therefore, is the pressure relation that exists in the event of a rupture in the normal service line or when the pedal 28 is not depressed.

In summary, therefore, in the event of loss of pressure in the service line 40 or any of the lines connected directly thereto, the emergency brake actuators can be operated merely by manual manipulation of the handle 76. Once the vehicle has been brought to rest under the influence of the operation of the emergency brake actuators, these actuators can be deactivated by restoring the handle 76 and the valve 54 to their positions as shown in FIGURE 1 and repressurizing the system formed by conduits 56–64 by operation of the pump 70 to thus permit removal of the vehicle for service purposes. As will be explained presently, the emergency brake actuators can also be individually mechanically deactivated. The emergency brake actuator portions of the actuators 24a–d may be also utilized as parking brake actuators by like manipulation of the handle 76 to operate the valve 54 to establish communication between conduits 56 and 84. In that event the pressure wtihin the system defined by the conduits 56–64 is merely relieved into the service system, through the master cylinder 26 and to the reservoir 66.

BRAKE ACTUATOR—FIRST EMBODIMENT

The first brake actuator embodiment is illustrated in FIGURES 2–7. The brake actuator as shown in FIGURE 2 has a multipart housing comprising externally threaded tubular part 98, intermediate part 100 and part 102. Basically, parts 98 and 100 house the service actuator and part 102 houses the spring and hydraulic stop-off of the emergency actuator portion.

Tubular part 98 projects within and is threadedly connected into the internally threaded counterbore 103 in the adjacent end of the intermediate part 100. The relative angular position between the parts 98 and 100 is fixed by a locking screw 104 which permits selective orientation of the parts 100 and 102 relative to the part 98 and the brake mechanism to which part 98 is fixed, so that the hydraulic hoses by which the actuator is connected to system of FIGURE 1 can be connected and positioned in the most desirable location.

Parts 100 and 102 are fixed together coaxially by a plurality of equally annularly spaced machine screws 104, gaskets 105 being provided about each screw 104 to prevent entrance of dirt and moisture into the interior of part 102. Part 102 is hollow internally and is provided with an outwardly resiliently biased end cap 106 retained within the annular recess 110 between the end face 108 of recess 110 and spring retainer ring 112. Fluid tight relation between the parts 100 and 102 is maintained by an O-ring 114 received in axially compressed relation in an annular groove 116 in the end face 118 of the part 100.

In the service actuator portion, a first piston 120, formed with a through opening 122, is axially slidably mounted within the bore 124 of the tubular member 98. The piston 120 is formed with a conoidal recess 126 and a cylindrical counterbore 128, the recess 126 seating against the hemispherical end face 130 of the wedge shank 132 of a brake actuating mechanism of the type illustrated and described in detail in the aforesaid Cox, et al. Patent No. 3,037,584. The tubular member 98 is threadedly received in the wedge housing and surrounding relation to the stem 132 of the wedge of such a brake.

Mounted within the cylindrical throughbore 134 of intermediate housing member 100 is an elongated piston 136. At its end adjacent the member 102, the piston 136 is formed with an annular groove 138 receiving an annular O-ring 140 forming a fluid tight seal between the piston 136 and the bore 134. At its extreme left end, piston 136 is formed with a reduced diametered extension 142 which, when piston 136 is in its position as illustrated in FIGURE 2, cooperates with the bore 134 to define an annular chamber 144 into which hydraulic fluid may be introduced via the passage 146. Passage 146 is connected to the service lines 42, 44, 46 or 48 (see FIGURE 1).

Referring to FIGURES 1 and 2, when the brake pedal 28 is depressed to actuate the master cylinder 26 to pressurize the fluid in the system formed by conduits 32, 34, 36, 38, 40, 42, 44, 46 and 48, the pistons 136 in each of the actuators 24a–d are shifted to the right, as viewed in FIGURE 2, forcing the piston 120 against which they abut and the wedge plungers 132 against which the pistons 120 abut to the right to energize the brakes.

By this arrangement, bore 124 of the tubular member 98 provides a large internal chamber to accommodate the pivoting motions of the stem 132 while a small diameter piston 136 is provided, thus minimizing the quantity of hydraulic fluid which must be introduced via the passage 146 to fully actuate the brake. In one practical embodiment of this invention, the stroke of the pistons 136 and 120 is 1.750″. The structure illustrated in FIGURE 2 accommodates this large magnitude of motion with a practical minimum volume in the chamber between the piston 136 and the member 102 to receive hydraulic fluid via the passage 146.

As indicated previously, the interior of member 102 is generally hollow. Member 102 has a generally cylindrical exterior wall, a transverse end wall 148 and a coaxial central internal annular portion 150 projecting from the wall 148 toward the end plate 106. Within the annular portion 150 is a coaxial hub 152 also integral with the wall 148 and projecting toward the end plate 106. A piston 154 is axially slidably mounted within the bore 156 of the annular portion 150. Piston 154 has an external annular peripheral groove 158 receiving an O-ring 160 and a back-up ring 161 maintaining a sliding fluid seal between piston 154 and bore 156. Piston 154 has an integral stem 162 coaxial therewith and extending through an aperture 164 in the boss 152. When the pistons 154 and 136 are in their positions as illustrated in FIGURE 2, stem 162 abuts the end portion 142 of the piston 136.

A fluid tight seal is established between the boss 152 and the stem 162 of the piston 154 by a stuffing box construction 166 comprising O-rings 168 and 170, back-up rings 172 and 174 and an annular spacer 176 received within the concentric annular grooves within the bore 164 of boss 152 as shown in FIGURE 2.

The piston 154, the annular portion 150, the wall 148 and stem 162 thus define an annular fluid pressure chamber normally filled with pressurized hydraulic fluid and in fluid communication through the port 178 with the pressurized fluid system indicated in FIGURE 1 by the conduits 56–64. Counter-clockwise rotation of the valve 54 as previously described will relieve the pressure in that system and thus relieve the fluid pressure from the chambers 179 of each of the actuators 24a–d.

Referring again to FIGURE 2, the piston 154 is resiliently biased to the right as viewed in FIGURE 2 by a compressed coil spring 180 coaxial with the piston 154. One end of the coil spring 180 abuts the interior face of the end plate 106. Disposed within the spring 180 is a cup shaped member 182 having a generally cylindrical side wall 184, a radially extending end flange 186 and a central end wall 188 at the opposite end. As is apparent from FIGURE 2, the opposite end of the coil spring 180 abuts the flange 186 of the cup shaped member 182. Disposed within the cylindrical wall 184 is a tubular member 190 fixed to the end wall 188 by screws 192 and threadedly connected to the piston 154 and 194. By this construction, the force of the spring 180 is transmitted through the cup shaped member 182 and the tubular member 190 to bias the piston 154 to the right as viewed in FIGURE 2. The interior diameter of the cylindrical portion 184 is greater than the external diameter of the annular portion 150 of the member 102 and the external diameter of the tubular member 190 is of lesser diameter than the internal diameter of the portion 150 of the member 102, so that these components can telescopically interfit.

By this construction, so long as the pressure within the chamber 179 is sufficiently great, when acting upon the face of the piston 154 exposed to chamber 179 to develop a force exceeding the force of the spring 180, the spring 180 will be compressed to the condition illustrated in FIGURE 2 and the end wall 188 of the cup shaped member 182 will remain in abutment with the interior face of the end plate 106. While this pressure is maintained, the brakes may be applied in the normal manner through actuation of the master cylinder 26 under control of the pedal 28 (FIGURE 1) to increase the pressure of the hydraulic fluid transmitted to the piston 136 (FIGURE 2) via the inlet port 146 to thereby shift the pistons 136 and 120 to the right as viewed in FIGURE 2 to thereby engage the brake. Release of the pressure applied through the conduit 146 will disengage the brake, the pistons 136 and 120 being restored to their FIGURE 2 position under the influence of a compression spring (not shown) forming a part of the brake mechanism as is illustrated in the aforesaid Cox, et al. Patent No. 3,037,584.

In the event of relief of the pressure within the chamber 179 by relief of the pressure within the chamber 179 by relief of the pressure in the system formed by the conduits 56–64 as previously explained in reference to FIGURE 1, the spring 180 will expand, shifting the cup shaped member 182, the tubular member 190, the piston 154 and the pistons 136 and 120 and the wedge stem 132 to the right as viewed in FIGURE 2, to thereby energize the brake. It will be noted that the force of the spring 180 is transmitted to hte wedge stem 132 by a series of members which are in direct metal to metal contact, there being no interposed hydraulic column absorbing the force of the spring 180.

Once the vehicle has been brought to rest by actuation of the brakes under the influence of the springs 180, it is necessary to recompress the spring 180 before the vehicle can be moved. If the pressure from the system formed by the conduits 56–64 has been relieved merely to apply the brakes as a parking brake, the springs 180 may be recompressed by manual actuation of the pump 70 to repressurize the system formed by the conduits 56–64 once the valve 54 has been restored to its FIGURE 1 position. If, however, there has been a hydraulic failure, it may not be possible to recompress the springs 180 by repressurizing the system formed by conduits 56–64. In that event, it will still be necessary to disengage the brakes so that the vehicle can be moved to a suitable location where the hydraulic brake system can be repaired. For this purpose, a means (now to be described) is provided on each of the actuators 24a–d for for mechanically compressing the springs 180.

Referring again to FIGURE 2, this mechanical means includes an opening 196 through the tubular member 190 of suitable non-circular cross section, (square, for example) and externally threaded bolt 198, having its head 200 on the exterior side of the end plate 106 and extending coaxially into the through opening 196 in the tubular member 190. Bolt 198 is journalled for rotation in the opening 202 in the end plate 106, being axially fixed relative to the end plate 106 by a retainer ring 204. An O-ring 206 is provided to prevent entrance of dirt into the interior of the member 102 and bearing washers 208 and 210 are provided to assure free rotation of the bolt 198 relative to the end plate 106. A nut 212 of complementary cross section to the opening 196 is threaded on the bolt 198 and interfits within the opening 196 with a free sliding fit so that, upon rotation of the screw 198, the nut 212 is free to move axially within the opening 196 but cannot rotate in the opening 196. A retainer nut 214 is fixed on the end of the bolt 198 and is free to rotate within the opening 196. By this construction, rotation of the bolt 198 will move the nut 212 from its inactive position as shown in FIGURE 2 toward the end plate 106. If the pressure has been relieved from the chamber 179 so that the members 184 and 190 and pistons 154, 136 and 120 are in their position as shown in FIGURE 3, the rotation of the bolt 198 will move the nut 212 to the left as viewed in FIGURES 2 and 3 and, through its engagement with end wall 188 of the member 182, retract the members 182 and 190 and the piston 154 to the left to its FIGURE 2 position. The pistons 136 and 120 will be restored to their FIGURE 2 position by the spring of the brake mechanism which biases the wedge stem 132 to the left as viewed in FIGURE 2.

SECOND EMBODIMENT

A second embodiment of the present invention is illustrated in FIGURES 8–10. This embodiment is functionally very similar to the first embodiment but is adapted for use in installations where the external diameter of the actuator of FIGURES 2–7 cannot be accommodated but a greater overall length can be. Referring now to FIGURE 8, the second embodiment comprises a housing 230 having coaxially aligned bores 232, 234, 236 and 238. Housing 230 is externally threaded at one end as indicated at 240 for threaded engagement with the brake mechanism actuator housing as indicated in the aforesaid Cox, et al. Patent No. 3,037,584, and an internally threaded counterbore 242 at its opposite end.

A piston 244 is axially slidably mounted in the bore 238. Piston 244 has a through aperture 246 to permit free passage of air therethrough and a frusto-conoidal recess 248 and cylindrical counterbore 250 to accommodate the end of the wedge stem 252.

A piston 254 is slidably mounted within the bore 236. It has a radially compressed O-ring 256 in its annular groove 258 to preclude fluid passage through the bore 236 about the piston 254. A reduced diameter end portion 260 of the piston 254 coacts with the bore 236 to define an annular chamber 262 into which hydraulic fluid is introduced via the inlet passage 264.

Referring to FIGURE 1, the inlet passages 264 of the several actuators 224a–d are in constant fluid communication with the conduits 42, 44, 46 or 48. Thus actuation of the pedal 28 to operate the master cylinder 26 will force hydraulic fluid into the inlet bore 264 and the chamber 262 to move the piston 254 to the right as viewed in FIGURE 8.

A piston 266 having an O-ring 268 and a backup ring 270 within its annular peripheral groove 272 is axially sliadably mounted within the bore 232. Piston 266 has a coaxial stem 274 extending through the bore 234 into abutment with the adjacent end of the piston 254.

Piston 266, its stem 274 and the housing 230 define an annular chamber 276 normally filled with hydraulic fluid maintained under a predetermined pressure by communication with a pressurized hydraulic system through the inlet pasage 278. Referring again to FIGURE 1, the inlet passages 278 of the actuators 224a–d are connected to the emergency hydraulic pressurized system formed by the conduits 56–64. Thus, so long as hydraulic pressure of a predetermined magnitude is maintained within that system, that pressure will be maintained within the chamber 276 to maintain the piston 266 against the fixed annular abutment ring 280. Fluid flow along the stem 274 (FIGURE 8) of the piston 266 between the chambers 276 and 262 is precluded by O-rings 282 and 284 received in annular grooves in the wall of the bore 234 and retained between backup rings as shown in FIGURE 8.

The stop ring 280 is fixed relative to the housing 230 against the radially extending end wall 286 of the threaded bore 242 by the radially extending flange 288 of the cup shaped housing member 290 and the externally threaded clamping nut 292 which surrounds the housing 290 and is threadedly received within the threaded bore 242 as shown in FIGURE 8. Disposed within the housing 290 is a long coil spring 294. At its left end as viewed in FIGURE 8, the coil spring 294 abuts the end wall 296 of the housing 290. At its opposite end it abuts the radially extending flange 298 of the release bolt sleeve 300 which abuts the adjacent face of the piston 266. By this construction, the spring 294 biases the piston 266 and its stem 274 to the right, as viewed in FIGURE 8. So long as the fluid pressure within the annular chamber 276 is sufficiently great, piston 266 will exert a sufficiently large force on the spring 294 to maintain it in its compressed condition as illustrated in FIGURE 8. Upon reduction of the pressure within the chamber 276, the spring 294 will expand to move the piston 266 and its stem 274 to the right to the position illustrated in FIGURE 9, thereby shifting pistons 254 and 244 to the right to move the wedge and its stem 252 to engage the brake. This operation is substantially identical with the operation as described in the preceding embodiment.

As in the preceding embodiment, the spring 294 can be mechanically compressed to release the brake. For this purpose, a bolt 304 extends through aligned apertures 306 and 307 in the housing 290 and the release bolt sleeve 300 respectively, and is maintained in axially fixed position relative to the housing 290 by an end cap 308 threaded upon the exterior of the housing 290 as indicated at 310. The cover 308 clamps the radial flange 312 of the bolt 304 to prevent its inadvertent rotation and prevents entry of dirt and moisture to the interior of housing 290. When it is desired to mechanically compress the spring 294, the cover 308 is rotated slightly to release the clamping engagement upon the radial flange 312 with a bolt 304, and a wrench applied to the head 314 of the bolt 304 to rotate the bolt 304. A nut 316 is threadedly mounted on the externally threaded shank 318 of the bolt 304, the end of that shank 318 being enlarged as indicated at 302 to prevent disassembly of the nut 316 from the bolt 304. The nut 316 is of such size and of such external form complementary to the interior portion of the sleeve 300 that the nut 316 is free to move axially within the sleeve 300 but cannot rotate relative to the sleeve 300. Thus, upon rotation of the bolt 304, the nut 316 travels along the threaded shank 318 into engagement with the sleeve at 322 and 324, to thereby move the sleeve 300 to the left as viewed in FIGURES 8 and 9, and thereby compress the sleeve 300 from its FIGURE 9 position back to its FIGURE 8 position, thus permitting the spring associated with the wedge shank 252 to move the pistons 244, 254 and 266 back to their FIGURE 8 position and de-energize the brake.

As the mode of operation of this embodiment is substantially the same as that of the first embodiment previously described in detail, further explanation is not deemed necessary.

We claim:

1. A combined emergency and service hydraulic actuator for wedge type brakes having:

(a) a housing member defining an expansible hydraulic chamber and having therein a first hydraulically actuated piston operative in response to hydraulic pressure within said chamber to move the wedge type actuator of and thereby engage an associated wedge type brake;

(b) a spring motor having an output and operable to bias said first piston toward its brake engaging position; and (c) hydraulic means including a second piston connected to said spring motor output and normally operative to prevent said spring motor from so biasing the first said piston, wherein said spring motor comprises:

(d) a hollow housing closed at one end;

(e) a coil spring disposed coaxially within and closely surrounded by the interior wall of said housing, one end of said coil spring abutting said housing closed ends;

(f) a hollow spring guide coaxially disposed within and closely surrounded by said coil spring, said guide having an outwardly extending projection at its end remote from said housing closed end and engaged by the other end of said coil spring, whereby said guide is resiliently biased by said coil spring away from said housing closed end, said spring guide constituting said spring motor output;

(g) said second piston of said hydraulic means being rigidly connected to said hollow spring guide and disposed radially adjacent said hollow spring guide outward projection at all positions.

2. The actuator defined in claim 1 further comprising selectively operable mechanical means independent of said hydraulic means for preventing said spring motor from biasing the first said piston toward said brake engaging position, said last named means comprising means for clamping said hollow spring guide to said housing closed and, 3. A combined emergency and service hydraulic actuator for wedge type brakes having:

(a) a housing member defining an expansible hydraulic chamber and having therein a first hydraulically actuated piston operative in response to hydraulic pressure within said chamber to move the wedge type actuator of and thereby engage an associated wedge type brake;

(b) a spirng motor having an output and operable to bias said first piston toward its brake engaging position; and (c) hydraulic means including a second piston connected to said spring motor output and normally operative to prevent said spring motor from so biasing the first said piston, wherein said spring motor comprises:

(d) a hollow housing closed at one end;

(e) a coil spring disposed coaxially within and closely surrounded by the interior wall of said housing, one end of said coil spring abutting said housing closed end;

(f) a hollow spring guide coaxially disposed within and closely surrounded by said coil spring, said guide having an outwardly extending projection at its end remote from said housing closed end and engaged by the other end of said coil spring, whereby said guide is resiliently biased by said coil spring away from said housing closed end, said spring guide constituting said spring motor output;

(g) said hydraulic means being disposed in coaxial alignment with and telescopically interfitting within said hollow spring guide when said hydraulic means is inoperative, said second piston of said hydraulic means being connected to said hollow spring guide at the end of said hollow spring guide adjacent said housing closed end.

4. A combined emergency and service hydraulic actuator for wedge type brakes having:

(a) a housing member defining an expansible hydraulic chamber and having therein a first hydraulically actuated piston operative in response to hydraulic pressure within said chamber to move the wedge type actuator of and thereby engage an associated wedge type brake;

(b) a spring motor having an output and operable to bias said first piston towards brake engaging position; and (c) hydraulic means including a second piston connected to said spring motor output and normally operative to prevent said spring motor from so biasing the first said piston;

(d) said spring motor comprising a hollow housing closed at one end; a coil spring disposed coaxially within and closely surrounded by the interior wall of said housing, one end of said coil spring abutting said housing closed end; and a hollow spring guide coaxially disposed within and closely surrounded by said coil spring, said guide having an outwardly extending projection at its end remote from said housing closed end and engaged by the other end of said coil spring, whereby said guide is resiliently biased by said coil spring away from said housing closed end, said spring guide constituting said spring motor output, and (e) a motion transmitting member mounted for rectilinear reciprocation at the end of the first said piston adjacent the brake to be actuated, said motion transmitting member abutting said first piston at one end and having an open faced socket at the other end in coaxial alignment with said first piston to receive a shank of a wedge of a wedge brake to be actuated, said motion transmitting member being axially slidably received within a bore of substantially greater cross section than the cross section of said first piston, thereby providing space for lateral movement of the wedge shank.

5. A combined emergency and service hydraulic actuator for wedge type brakes having:

(a) a housing member defining an expansible hydraulic chamber and having therein a first hydraulically actuated piston operaive in response to hydraulic pressure within said chamber to move the wedge type actuator of and thereby engage an associated wedge type brake;

(b) a spring motor having an output and operable to bias said first piston toward its brake engaging position; and (c) hydraulic means including a second piston connected to said spring motor output and normally operative to prevent said spring motor from so biasing the first said piston, (d) said spring motor comprising a hollow housing closed at one end; a coil spring disposed coaxially within and closely surrounded by the interior wall of said housing, one end of said coil spring abutting said housing closed end; and a hollow spring guide coaxially disposed within and closely surrounded by said coil spring, said guide having an outwardly extending projection at its end remote from said housing closed end and engaged by the other end of said coil spring, whereby said guide is resiliently biased by said coil spring away from said housing closed end, said spring guide constituting said spring motor output; and (e) a motion transmitting member mounted for rectilinear reciprocation at the end of the first said piston adjacent the brake to be actuated, said motion transmitting member abutting said first piston at one end and having an open face socket at the other end and in co-axial alignment with said first piston to receive the shank of a wedge of a wedge brake to be actuated, said motion transmitting member being axially slidably received within a cylindrical bore of substantially greater diameter than the diameter of the first said piston, said motion transmitting member being provided with a through aperture between its opposite end faces whereby there is fre fluid communication between the opposite faces of said motion transmitting member.

6. The actuator defined in claim 5 wherein said cylindrical bore is the interior wall of an externally threaded tubular member, threadedly received within an internally threaded bore in the housing for the first said hydraulically actuated piston and means for locking said tubular member and the housing of the first said piston in any selected relative angular position with respect to their common axis.

7. A combined emergency and service hydraulic actuator for wedge type brakes having:
 (a) a housing defining an expansible hydraulic chamber and having therein a first hydraulically actuated piston operative in response to hydraulic pressure within said chamber to move the wedge type actuator of and thereby engage an associated wedge type brake;
 (b) a spring motor having an output operable to bias said first piston toward its brake engaging position;
 (c) hydraulic means including a second piston connected to said spring motor output and normally operative to prevent said spring motor from so biasing the first said piston;
 (d) a motion transmitting member mounted for rectilinear reciprocation at the end of the first said piston adjacent the brake to be actuated, said motion transmitting member abutting said first piston at one end and having an open faced socket at the other end in coaxial alignment with said first piston to receive the shank of a wedge of a wedge brake to be actuated, said motion transmitting member being axially slidably received within a bore of substantially greater cross section than the cross section of the first said piston, thereby providing space for lateral movement of the wedge shank.

8. A combined emergency and service hydraulic actuator for wedge type brakes having:
 (a) a housing defining an expansible hydraulic chamber and having therein a first hydraulic actuated piston operative in response to hydraulic pressure within said chamber to move the wedge type actuator of and thereby engage an associated wedge type brake;
 (b) a spring motor having an output operable to bias said first piston toward its brake engaging position;
 (c) hydraulic means including a second piston connected to said spring motor output and normally operative to prevent said spring motor from so biasing the first said piston;
 (d) a motion transmitting member mounted for rectilinear reciprocation at the end of the first said piston adjacent the brake to be actuated, said motion transmitting member abutting said first piston at one end and having an open faced socket at the other end in coaxial alignment with said first piston to receive the shank of a wedge of a wedge brake to be actuated, said motion transmitting member being axially slidably received within a cylindrical bore of substantially greater diameter than the diameter of the first said piston and said motion transmitting member being provided with a through aperture between its opposite end faces whereby there is free fluid communication between the opposite faces of said motion transmitting member.

9. The actuator defined in claim 8 wherein said cylindrical bore is the interior wall of an externally threaded tubular member, threadedly received within an internally threaded bore in the housing for the first said hydraulically actuated piston and means for locking said tubular member and the housing of the first said piston in any selected relative angular position with respect to their common axis.

References Cited

UNITED STATES PATENTS

| | | | |
|---|---|---|---|
| 1,561,341 | 11/1925 | Martin | 92—62 X |
| 2,215,546 | 9/1940 | Dick | 188—170 |
| 2,315,816 | 4/1943 | Rodgers | 92—130 |
| 2,766,732 | 10/1956 | Schultz | 92—63 X |
| 3,136,227 | 6/1964 | Williams | 92—63 |
| 3,232,175 | 2/1966 | Cox et al. | 92—63 X |
| 3,347,043 | 10/1967 | Freese | 92—163 X |

FOREIGN PATENTS

| | | |
|---|---|---|
| 1,376,689 | 9/1964 | France. |
| 993,333 | 5/1965 | Great Britain. |
| 97,661 | 4/1961 | Netherlands. |

MARTIN P. SCHWADRON, Primary Examiner

I. C. COHEN, Assistant Examiner

U.S. Cl. X.R.
92—129, 130